Sept. 9, 1969  H. C. FLINT  3,466,088
ENERGY ABSORPTION SEAT
Filed Jan. 4, 1967  2 Sheets-Sheet 1
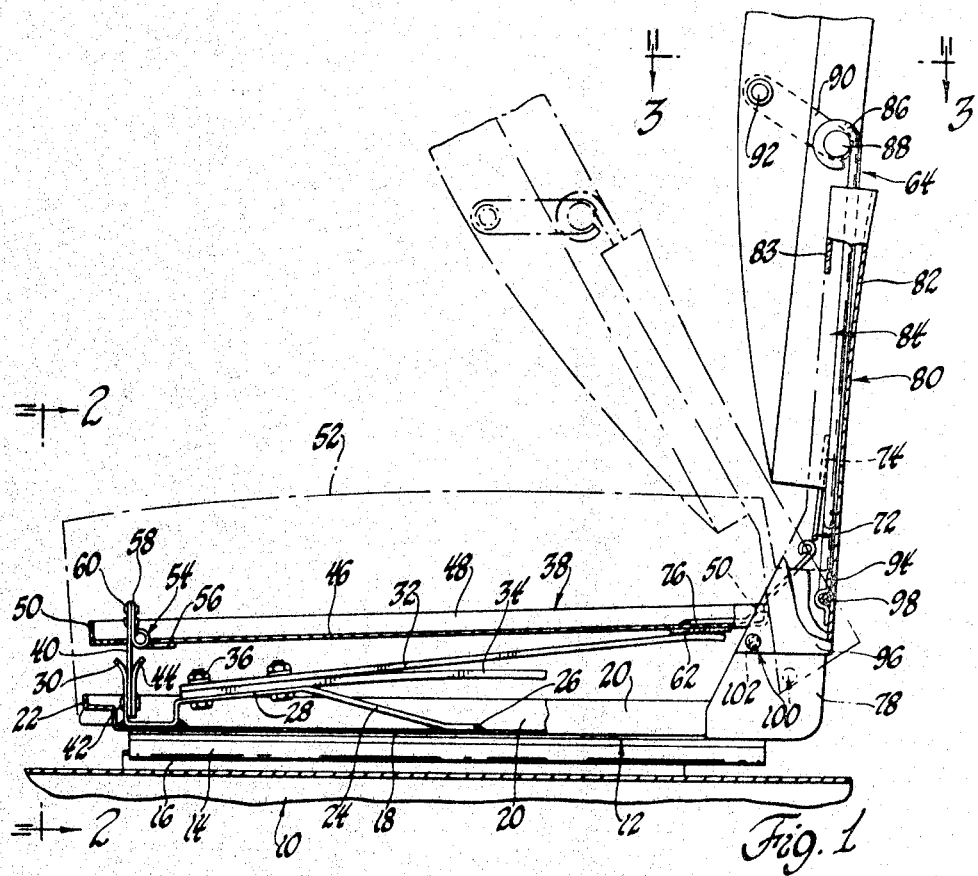
Fig. 1
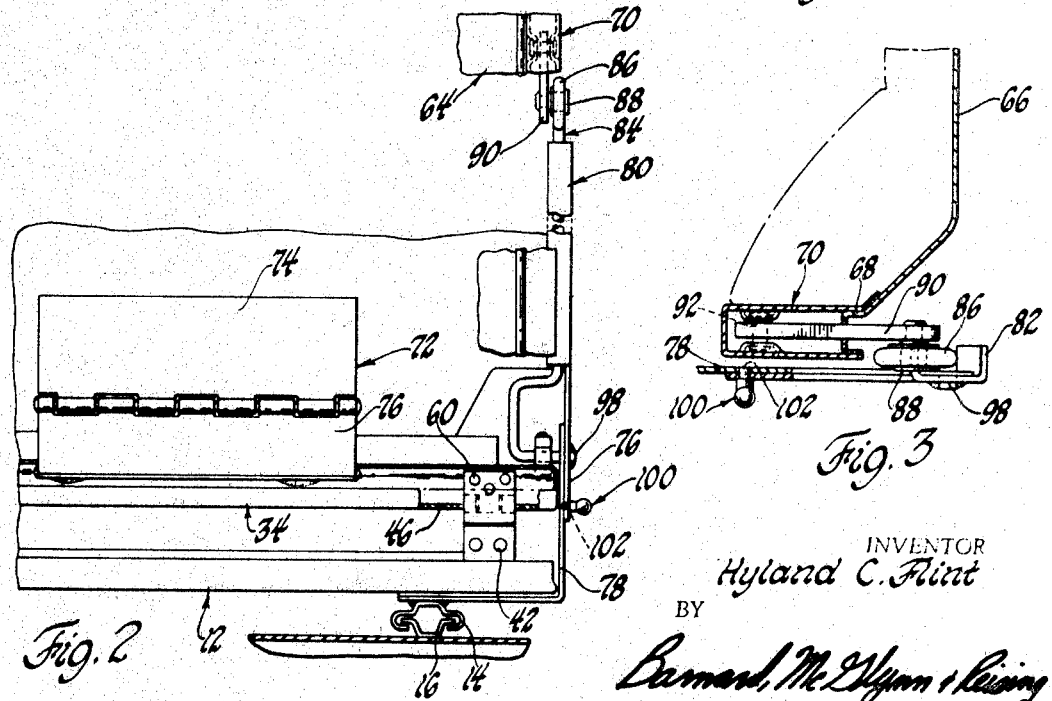
Fig. 2
Fig. 3
INVENTOR
Hyland C. Flint
BY
Barnard, McGlynn & Reising
ATTORNEYS Sept. 9, 1969  H. C. FLINT  3,466,088
ENERGY ABSORPTION SEAT
Filed Jan. 4, 1967  2 Sheets-Sheet 2

INVENTOR.
Hyland C. Flint
BY
Barnard, McGlynn & Reising
ATTORNEYS

United States Patent Office 3,466,088
Patented Sept. 9, 1969

3,466,088
ENERGY ABSORPTION SEAT
Hyland C. Flint, 3551 Walnut Lake Road, Rte. 2,
Orchard Lake, Mich. 48033
Filed Jan. 4, 1967, Ser. No. 607,205
Int. Cl. A47c 3/00, 1/02; B60n 1/02
U.S. Cl. 297—296
11 Claims

ABSTRACT OF THE DISCLOSURE

A seat structure for either vehicles or as furniture having a seat pan pivotally and flexibly mounted at its forward end on a support structure, such mounting permitting the seat pan limited horizontal movement relative to the support; and a back support pan flexibly mounted for limited horizontal movement relative to the support structure; the back pan and seat pan being pivotally connected for unison action.

---

This invention relates to seat structures, and more particularly to a seat structure having a seat member and a back member that are mounted for limited horizontal movement relative to a supporting structure.

In the manufacture and use of seat structures, and particularly where such seat structres are used in motor vehicles, it is the normal practice to provide some sort of cushioning or resilient support for the occupant for the occupant's ease and comfort. However, such cushioning or resilient support normally forms the only resilience in the seat structure, and fails to accommodate horizontal movement of the occupant relative to the seat structure, such as might be caused by impacts or rapid acceleration in the case of motor vehicle use, or changes in seating posture and the like when the seat structure, is in the form of stationary furniture use. In present seating, any such horizontal movements must be accommodated by the upholstery or springs that support the occupant, and these are seldom designed to take the kind of movement to which the occupant may be subjected. The result is an abnormal stress on the cushioning means, as well as abnormal stress on the seat covering, which might tear such cover and present an unsightly appearance.

The device in which this invention is embodied comprises, generally, a seat structure including a support structure over which is supported a seat member, which in turn receives the cushioning or resilient means for supporting the occupant, and a back member, also mounted on the support structure to provide a backrest for the occupant. The seat member and the back member are so mounted on the support structure that limited horizontal movement is permitted, exclusive of the cushioning or upholstery, to take up horizontal movements of the occupant due to road conditions, if such seat structure is used in a vehicle, or to accommodate changes in seating position and posture, if the seat structure is in furniture use. Such limited horizontal movement is permitted by means of spring members having means in conjunction therewith to limit the fore and aft, or horizontal movement, or degree of resilience of the spring members.

Thus, a seat structure so designed will permit energy to be absorbed in all directions, the cushioning or upholstery taking the normal vertical movement and the spring members taking the horizontal movement, to provide more complete support for the occupant. In automotive or vehicle use, this provides a great safety feature in that impacts or extremely rapid acceleration or deceleration will not tend to throw the occupant from the seat, nor cause him to slide on the seat surface, and will give the occupant a firm yet resilient support under most conditions.

These and other advantages will become more apparent from the following description and drawings in which:

FIGURE 1 is a side elevational view of a seat structure with parts broken away and in section, illustrating the position of the various members;

FIGURE 2 is a front elevational view of the seat structure shown in FIGURE 1, taken substantially along the line 2—2 of FIGURE 1, and looking in the direction of the arrows, with parts broken away and in section to illustrate the position of the various members;

FIGURE 3 is a cross-sectional view of a portion of the seat structure illustrated in FIGURES 1 and 2, taken substantially along the line 3—3 of FIGURE 1, and looking in the direction of the arrows;

Figure 4:
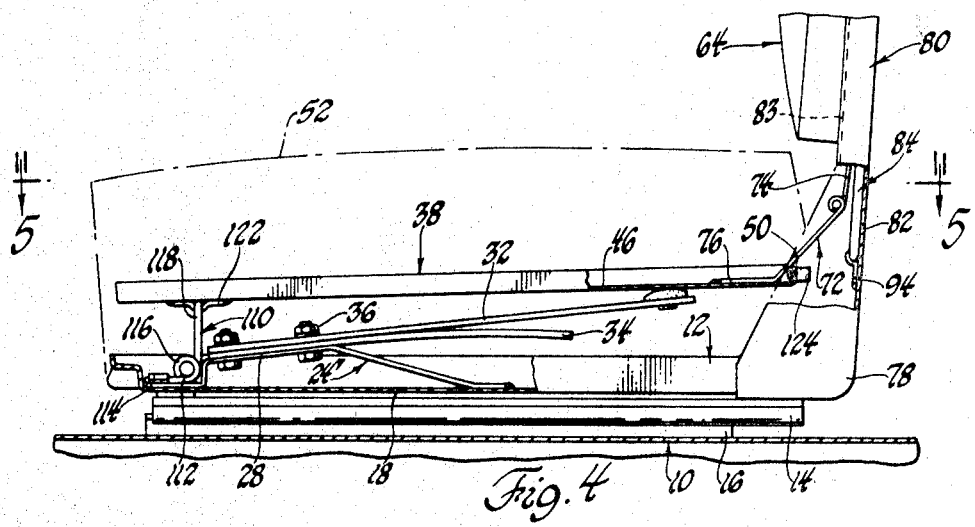
FIGURE 4 is a side elevational view with parts broken away and in section of a modification of the seat structure shown in FIGURES 1–3.

Referring more particularly to the drawings, FIGURES 1–3 best illustrate a preferred embodiment of the invention showing the seat structure mounted on a vehicle floor or the like, indicated generally by the numeral 10. It should be understood at the outset that the seat structure is equally adaptable to furniture use and is shown as a vehicle seat only for ease in the description and illustration. It is further to be noted that the seat structure illustrated and described herein is of the unison action type, where the back support member moves with deflection of the seat support member in such a manner as to maintain the angularity of the back support member with respect to the supporting structure, although the structure herein illustrated and described is equally adaptable to non-unison action seating structures as well. Additionally, the following description is directed, for the most part, to one side of the overall seat structure, and it should be understood that like parts will be found at the other side.

Mounted over the vehicle floor 10 is a supporting pan, illustrated generally by the numeral 12, movably supported on the floor 10 by means of upper and lower track members, 14 and 16 respectively, in a well-known manner. Support structure 12 includes a floor pan 18 having upwardly directed side flanges 20 and upwardly directed end flanges, such as front flange 22.

Mounted on the floor pan 18, and on opposite sides of the support structure 20, is a ramp member 24 secured to the pan at its rearward end, as by weld 26, and having as an integral portion thereof an upwardly and rearwardly directed ramp 28. The forward end of the member 24 is upwardly and arcuately forwardly directed, as at 30, for purposes to become hereinafter more apparent. Mounted on the ramp portion 28 are primary and secondary leaf springs, 32 and 34 respectively, secured to the ramp portion 28 in any suitable manner as by nut and bolt assemblies 36. Spring members 32 and 34 extend rearwardly and upwardly of the support structure 12 to provide rearward support for the seat pan, illustrated generally by the numeral 38.

Secured to the forward and upwardly directed flange 30 of the member 24 is a leaf spring 40 secured to the flange in any suitable manner as by rivets 42. Such leaf spring is permitted fore and aft deflection relative to the support structure 12, the spring being limited in its forward movement by the flange 30 and limited in its rearward movement by a second arcuate flange 44, secured to the flange 30 by the rivets 42.

Seat member 38 is also a pan structure, having a floor 46, upwardly directed side flanges 48 and upwardly directed end flanges 50. Such pan 38 provides means for receiving the seat cushioning structure which may be in the form of foam rubber or the like, or other types of metallic springs in the usual and well-known manner. Covering the foam rubber or springs is the usual upholstery or covering material, indicated at dashed and dotted lines 52.

The forward end of the seat pan 38 is secured to leaf spring 40 by means of a hinge, indicated generally by the numeral 54, such hinge having a leaf 56 rigidly secured to the seat pan 38 and a leaf 58 secured to the leaf spring 40 by means of rivets or the like 60. It will thus be apparent that the seat pan 38 is pivotally mounted at its forward end relative to the support structure 12, and at the rearward end is supported by primary leaf support spring 32 with a Teflon or plastic frictionless pad 62 therebetween. The seat pan 38 may thus pivot about the pivot shaft of hinge 54, against the support springs 32 and 34, with deflection caused by the occupant or by road jounce and rebound.

Rearwardly of the seat support member 38 and extending upwardly therefrom is a back support member, indicated generally by the numeral 64. Back support member 64 may also be in the form of a pan having a floor surface 66, as best illustrated in FIGURE 3, terminating in side channels 68 receivable in side upright channels, indicated generally by the numeral 70, the purpose for which will become hereinafter more apparent. The back member 64 is pivotally secured to the rearward end of the seat member 38 by means of a hinge, indicated generally by the numeral 72, hinge 72 having a leaf 74 secured to the back support pan 66 in any suitable manner, as by welding, and a second leaf 76 secured to the seat support pan 38 in any suitable manner, as by welding. Thus, the back support member 64 is pivotally secured to the seat support member 38 for vertical movement with the seat support member 38 in the well-known unison action manner.

Extending upwardly from the support structure 12 are corner plate members 78, and extending upwardly from plate members 78 is a channel member, indicated generally by the numeral 80. The rearward flange 82 of channel member 80 is arcuately and rearwardly disposed, for purposes to become hereinafter more apparent. Also mounted on the channel member 80 is an upwardly extending spring wire member, indicated generally by the numeral 84, such spring wire member terminating in an eye 86 to pivotally receive a bushing 88 which in turn is received in a link 90, the other end of the link 90 being pivotally received on a pivot pin 92 secured in the channel 70 of the back member 64. It will be apparent that as the seat member 38 and the back member 64 move upwardly and downwardly with deflection of the seat member relative to the support structure 12, the link 90 will pivot on its pivot points 92 and 88 to maintain its angularity relative to the support structure 12. The spring wire member 84 by its resilience, is permitted fore and aft movement, such movement being limited in the rearward direction by the arcuate flange 82 and being limited in the forward direction by the flange 83. Thus, the back member 64 is allowed horizontal movement by means of the spring wire rod member 84.

Rod member 84 is supported on the channel member 80 by means of strap or the like 94 secured to the channel member 80 in any suitable manner, as by welding.

Should it be desirable to permit the back support structure 64 to tilt forwardly over the seat support structure 38, as in automotive seating practice, the upright channel member 80 may terminate at its lower end in an enlargement 96 overlying the plate members 78 and received over the outwardly directed end 98 of the spring wire rod 84. Thus, the end 98 forms a pivot shaft for the enlargement 96 and the upward extension 80, permitting the back member 64 and the extension 80 to pivot or tilt forwardly.

A suitable latch device, indicated generally by the numeral 100, and of any well-known type, may be properly mounted on the extension 96 to be received in an aperture 102 in the plate member 78, so that the enlargement 96 and the upward extension 80 may be locked in place in its rearward position to prevent unauthorized forward tilting of the back structure.

Figure 5:
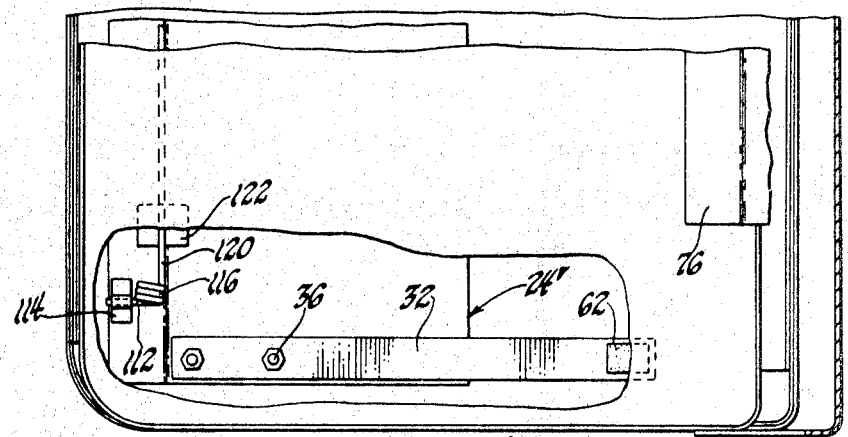
FIGURE 5 is a cross-sectional view of a portion of the seat structure illustrated in FIGURE 4, taken substantially along the line 5—5 of FIGURE 4, and looking in the direction of the arrows.

Referring next to FIGURE 4, a modification of the forward pivot mounting of the seat member 38 is illustrated, and in FIGURES 4 and 5 like parts are indicated by like reference numerals, as in FIGURES 1-3. As shown in FIGURES 4 and 5, there is mounted at the forward end of the support pan floor 18 a torsion spring, indicated generally by the numeral 110, one leg of the spring being secured to the floor member 18 by means of a clip 114 secured to the plate 18 in any suitable manner, as by welding. A plurality of coils 116 in the torsion spring member 110 terminate in an upwardly directed leg 118 which is then bent laterally as at 120 to extend across the front of the seat pan 38 to a similar configuration at the opposite side. The laterally bent portion 120 is pivotally secured to the floor 46 of the seat pan 38 by strap 122, welded or otherwise secured to the bottom of the seat pan 38. It will be apparent that the coils 116 of the torsion spring 110 permit resilience of the mounting and the fore and aft movement of the seat support member 38 to absorb the horizontal energy.

In order to limit the rearward movement of the seat member 38, a bumper 124 or the like may be secured in the rearward upwardly directed flange 50 of the seat pan 38, such bumper being adapted to engage the plate members 78 extending upwardly from the support structure 12 at the limit of the rearward movement of the seat pan 38. Alternatively, the bumper 124 may be mounted on the plate member 78 if desired. Forward movement of the seat member 38 can be limited by the spring wire rod 84, engaging the forward channel 83 of the upward extension 80.

As illustrated in FIGURE 4, should it be desired to eliminate the forward tilt of the back structure 64 relative to the seat member 38, the plate members 78 and the upward extension 80 may be integrally formed, thus preventing any form of forward tilt.

Figure 6:
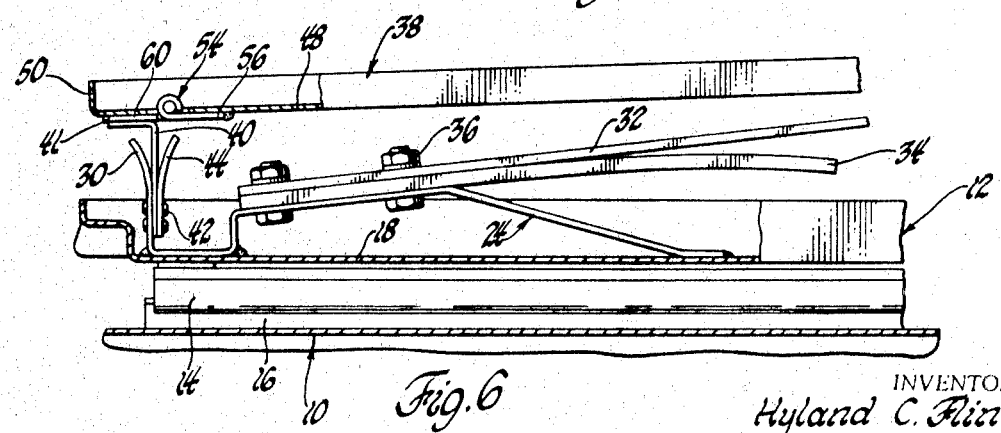
FIGURE 6 is a side elevational view of yet another modification of the seat structure illustrated in FIGURES 1–3 with parts broken away and in section to illustrate the position of the various parts.

Referring next to FIGURE 6, yet another modification of the forward pivot mounting of the seat member 38 is illustrated, wherein the supporting leaf spring 40 is formed with an outwardly directed bend 41 which is secured to the leaf 60 of hinge 54, the other leaf 56 being welded or otherwise secured to the floor 46 of seat pan 48. The limiting flanges 30 and 44 limit the forward and rearward movement for deflection of the leaf spring 40 and hinge 54 permits rotational motion of the pan 38 about the hinge pin for normal deflection of the seat structure.

Thus, a seat structure is provided that permits both horizontal and vertical energy absorption by a combination of the normal seat upholstery and resilient support, as well as spring support permitting fore and aft movement of both the seat member and the back member when such movement is dictated by the occupant or by the structure in which the seat is mounted. Such energy absorption provides a more comfortable seat structure, giving the occupant a sense of floating and providing safety features when the structure is utilized in moving vehicles.

Numerous changes and modifications will occur to those having skill in the art after having had reference to the foregoing description and drawings. However, it is not intended to limit the scope of the invention by the foregoing description and drawings, but by the scope of the appended claims.

I claim:
1. In a seat:
a support structure;
a seat member;

a back member pivotally secured to said seat member;

first means on said support structure and pivotally connected to said seat member for permitting pivotal movement and limited horizontal movement of said seat member relative to said support structure;

and second means on said support structure including an upwardly directed spring wire secured at one end to said support structure and pivotally connected at the other end to said back member for permitting vertical movement of said back member with pivotal movement of said seat member and limited horizontal movement of said back member relative to said support structure, said second means further including an upwardly and rearwardly extending arcuate portion on said support structure rearwardly adjacent said spring wire and spaced therefrom at the upper end thereof to limit rearward deflection of the spring wire and the back member and to increase the spring rate of the spring wire with rearward deflection thereof.

2. In the seat set forth in claim 1 wherein said first means on said support structure includes a resilient member secured to said support member and extending upwardly therefrom to pivotally engage said seat member.

3. In the seat set forth in claim 2 and further including a hinge member having one leaf thereof secured to said seat member and the other leaf thereof secured to said resilient member.

4. In the seat set forth in claim 3 wherein said resilient member is a leaf spring having one end thereof secured to said support structure and the other end thereof secured to said other leaf of said hinge member.

5. In the seat set forth in claim 4 and further including spring engaging members extending upwardly from said support structure and on opposite sides of said leaf spring and being formed arcuately outwardly away from said leaf spring, said spring engaging members limiting the horizontal movement of said leaf spring.

6. In the seat set forth in claim 2 wherein said resilient member is a torsion spring secured to said support structure and to said seat member.

7. In the seat set forth in claim 2 and further including a resilient member on the rearward edge of said seat member and engageable with said support structure to limit rearward horizontal movement of said seat member relative to said support structure.

8. In the seat set forth in claim 1 wherein said upwardly extending portion is pivotally mounted on said support structure to permit said portion and said back member to tilt forwardly over said seat member.

9. In the seat set forth in claim 8 further including releasable latch means for securing said portion in an upright position, said latch means being actuatable to permit said forward tilting movement.

10. A seat comprising:
a support structure;
first resilient means extending upwardly from the forward portion of said support structure;
a seat member pivotally secured to said resilient means and extending over said support structure and being permitted horizontal movement by said resilient means;
means for limiting the horizontal movement of said seat member relative to said support structure;
spring support means secured to said support structure and extending upwardly therefrom and engaging said seat member for permitting pivotal movement of said seat member;

a back member pivotally secured to the rearward portion of said seat member and movable therewith;

second resilient means extending upwardly from said support structure and being pivotally connected to said back member for maintaining the angular relation of said back member with said support structure upon movement of said back member with said seat member;

and means for limiting the horizontal movement of said second resilient means to permit limited horizontal movement of said back member relative to said support structure.

11. In a seat:
a support structure;
a spring member extending upwardly from the forward portion of said support structure and being resilient in a horizontal direction relative to said support structure;
a seat member pivotally secured at the forward end thereof to the upper portion of said spring member, said seat member extending rearwardly in spaced relation over said support structure and being rotatable relative thereto about said upper portion of said spring member and horizontally movable relative thereto with deflection of said spring member;
a back member pivotally secured to the rearward portion of said seat member and extending upwardly therefrom and being movable with movement of said seat member;
a link member pivotally secured at one end to said back member;
a spring wire member secured at one end to said support structure and extending upwardly therefrom and pivotally connected at the upper end thereof to the other end of said link member, said link member and said spring wire member maintaining the angularity of said back member relative to said support structure upon pivotal movement of said seat member;
first means for limiting the horizontal movement of said seat member;
and second means for limiting horizontal movement of said back member.

References Cited

UNITED STATES PATENTS

| | | | |
|---|---|---|---|
| 955,220 | 4/1910 | Stewart | 248—387 |
| 1,756,825 | 4/1930 | Hess | 297—309 |
| 2,366,730 | 1/1945 | Hickman | 297—308 |
| 2,636,544 | 4/1953 | Hickman | 297—308 |
| 2,681,823 | 6/1954 | Gaisman | 297—308 |
| 3,059,967 | 10/1962 | Flint | 297—309 |
| 3,123,401 | 3/1964 | Komenda | 297—379 |
| 3,237,986 | 3/1966 | Flint | 297—309 |
| 3,261,642 | 7/1966 | Flint | 297—309 |
| 3,294,442 | 12/1966 | Flint | 297—298 |
| 3,332,719 | 7/1967 | Flint | 297—309 |

FRANCIS K. ZUGEL, Primary Examiner

U.S. Cl. X.R.

248—387; 297—309, 340